United States Patent [19]

Sakata et al.

[11] 4,153,131

[45] May 8, 1979

[54] SUSPENSION DEVICE FOR FRONT WHEELS IN AUTOMOTIVE VEHICLES

[75] Inventors: Mamoru Sakata; Hiroshi Yoshioka; Masahiro Ohashi, all of Tokyo, Japan

[73] Assignee: Honda Giken Kogyo Kabushiki Daisha, Tokyo, Japan

[21] Appl. No.: 711,796

[22] Filed: Aug. 5, 1976

[30] Foreign Application Priority Data

Aug. 12, 1975 [JP] Japan .................................. 50-97896

[51] Int. Cl.² .............................................. B60K 17/30
[52] U.S. Cl. .................................... 180/43 R; 180/42
[58] Field of Search ...................... 180/42, 43 R, 43 A, 180/73 R; 280/661, 668, 674, 675; 267/34; 280/693, 696, 673

[56] References Cited

U.S. PATENT DOCUMENTS

| | | |
|---|---|---|
| 1,789,242 | 1/1931 | Marsh ................................. 180/42 |
| 2,477,090 | 7/1949 | Roeder et al. ...................... 180/43 R |
| 3,237,962 | 3/1966 | Kraus et al. ............................ 280/267 |
| 3,302,740 | 2/1967 | Giacosa ................................ 180/54 F |
| 3,469,859 | 9/1969 | Giacosa .................................. 280/668 |
| 3,703,215 | 11/1972 | Takahashi ........................... 180/43 R |

FOREIGN PATENT DOCUMENTS 2327609  12/1974  Fed. Rep. of Germany ........... 280/661

Primary Examiner—Joseph F. Peters, Jr.
Assistant Examiner—Edmond G. Rishell, Jr.
Attorney, Agent, or Firm—Polster, Polster and Lucchesi

[57] ABSTRACT

A suspension device for front wheels in automotive vehicles having front drive shafts of mutually different shaft length, in which unbalanced rotatory moment to be imparted to the king pin means at the left and right sides of the wheels caused by a difference in the angles of inclination at the left and right drive shafts is compensated by providing a difference in the center offset quantities at both left and right wheels.

9 Claims, 5 Drawing Figures

F I G. 1
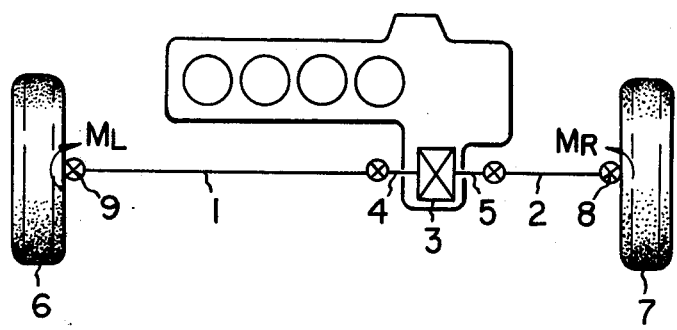
F I G. 2
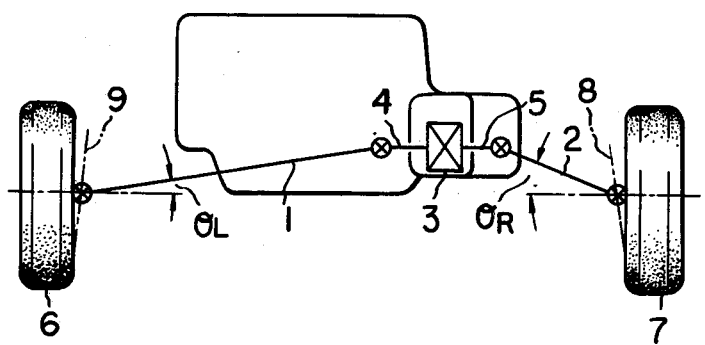

SUSPENSION DEVICE FOR FRONT WHEELS IN AUTOMOTIVE VEHICLES

BACKGROUND OF THE INVENTION

This invention relates to a suspension device for vehicles, and, more particularly, it is concerned with a suspension device for the front wheels in automotive vehicles such as automobiles, etc..

In the automobiles of a type, wherein the engine is mounted on the front part of the chassis in the direction orthogonal to the longitudinal direction of the vehicle chassis (i.e. the vehicle body) to drive the front wheels, it occurs not infrequently that the length of the front drive shafts is made different between the left and the right sides.

When the length of the left and the right shafts differs each other, the angles of inclination $\theta_L$ and $\theta_R$ of the respective left and right drive shafts extending from the output shaft of the differential gear to the respective left and right wheels become also different. On account of this, there occurs a difference in rotatory moments $M_L$ and $M_R$ which are developed in both left and right wheels by the driving torque at the time of speed acceleration, and which tend to cause the wheels to swing inwardly with the king pin means supporting the wheels as the center of the oscillation. The term "king pin means" is used herein to designate the support means defining the king pin axis (i.e., the steering axis) of the front wheel, whether a king pin shaft or an equivalent support structure is used. Since this rotatory moment increases as the angle of inclination of the drive shaft becomes larger, the relationship between the rotatory moments $M_L$ and $M_R$ is such that $M_R$ is larger than $M_L$ ($M_R > M_L$) with the result that the steering wheel (hence the vehicle itself) is apt to turn to the side of the longer drive shaft (i.e., to the side of the smaller rotatory moment.

In order therefore to solve the problem of deflection in the steering wheel, various attmepts have so far been made as to reducing the angles of inclination of the left and right drive shafts, or minimizing difference in length between the two drive shafts to the extent possible practicably. However, since the automotive vehicles are subjected to restriction in the diameter of the wheels, the road clearance, tread, and so forth from the standpoints of vehicle design as well as the Government's regulations, the angles of inclination and the lengths of the above-mentioned drive shafts are unavoidably limited. Such difficulty in designing the drive shafts becomes more marked as the size of the vehicles becomes smaller.

SUMMARY OF THE INVENTION

In view of the above-described problem and difficulty in the automotive vehicles, wherein the engine is placed at the front part of the vehicle chassis in the direction orthogonal to the longitudinal direction thereof, it is the primary object of the present invention to provide a suspension device for the front wheels in the automotive vehicles, in which, by providing a difference in the center offset quantities $e_R$ and $e_L$ (i.e., a space interval between the king pin axis on the wheel axle for the left and right wheels and the perpendicular lines passing through the center of the front wheels where they contact the ground surface), a rotatory moment to compensate, or cancel, the unbalanced rotatory moment (i.e., $M_R > M_L$) with respect to the above-mentioned king pin means at both left and right sides is generated to thereby bring the unbalanced rotatory moment to the wheels into a balanced state, and to prevent the steering wheel from being deflected to any one side at the time of the speed acceleration. As will become apparent hereinafter, the present invention does not concern the adjustment of the camber angles of the wheels, and the different center offset quantities $e_R$ and $e_L$ are referenced to a condition in which the camber angles of the wheels are identical.

According to the present invention, there is provided a suspension device for front wheels in automotive vehicles, which comprises in combination: front wheels at both left and right sides of the vehicle body, king pin means for suspending said front wheels at said both sides of the vehicle body, means for receiving and holding the king pin means at a predetermined angle, and drive shafts connected at one end thereof to said front wheels and at the other end thereof to an engine output, the drive shafts being different in the shaft length, wherein a center offset quantity between the left and the right wheels is made different to compensate unbalanced rotatory moment with respect to the axis of the king pin means at both left and right sides caused by difference in the angles of inclination of the drive shafts, and wherein fixing of the king pin means with respect to the front wheel drive shafts is so made as to satisfy the following equation to compensate unbalanced rotatory moment: $M_R + M_L + F \cdot e_R + F \cdot e_L = 0$ (where: $M_R$ is a rotatory moment exerted upon the axis of said king pin means at the right side; $M_L$ is a rotatory moment exerted upon the axis of said king pin means at the left side; F is a driving force of the front wheels; $e_R$ is a center offset quantity of the right front wheel; and $e_L$ is a center offset quantity of the left front wheel), thereby attaining the balance in the rotatory moment in both left and right front wheels.

The foregoing object, other objects, and the specific construction as well as functions of the suspension device according to the present invention will become more clearly understandable from the following detailed description thereof, when read in conjunction with the accompanying drawing.

BRIEF DESCRIPTION OF THE ACCOMPANYING DRAWING

In the drawing:

FIG. 1 is a plan view of a front axle of an automotive vehicle of a front drive type;

FIG. 2 is a front view of the same; and

Figure 3:
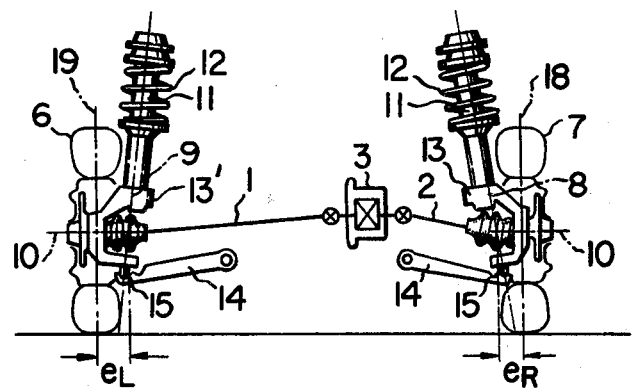
Figure 4:
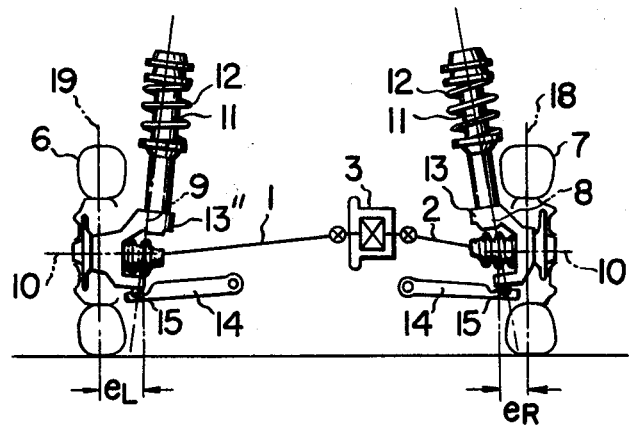
Figure 5:
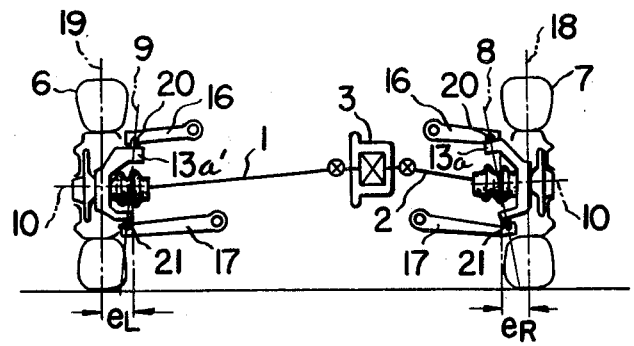

FIGS. 3, 4, and 5 are respectively front views of different preferred embodiments of the present invention to provide a difference in the center offset quantities between the left and right front wheels.

DETAILED DESCRIPTION OF THE INVENTION

Referring first to FIGS. 1 and 2 which illustrate the front axle of an automotive vehicle of the front drive type, when the lengths of the left and the right drive shafts 1 and 2 are different from each other, there results a difference in the angles of inclination $\theta_L$ and $\theta_R$ of both left and right drive shafts 1 and 2 respectively extending from the output shafts 4 and 5 of the differential gear 3 up to the respective left and right front wheels 6 and 7. With such difference in the angles of inclination being present, there is created, by the driving torque to be imparted to the front wheels at the time of speed acceleration, a difference in the rotatory moments of drive $M_L$ and $M_R$ which tend to oscillate the wheels 6 and 7 inwardly with the respective king pin axes 8 and 9 as the center of the oscillation. In this case, the larger the angles of inclination of the drive shafts are, the larger becomes the rotatory moments to the front wheels with the consequence that the rotatory moment $M_R$ exerted upon the axis of said king pin means at the right side becomes greater than the rotatory moment $M_L$ exerted upon the axis of said king pin means at the left side, whereby the steering wheel tends to be deflected to the side of the longer drive shaft.

In order to eliminate such undesirable tendency, the present invention proposes to provide a difference in the center offset quantities $e_L$ and $e_R$ in the left and the right front wheels 6 and 7 (i.e., space intervals between the axes 8 and 9 of the king pin means on the axle line 10 as viewed from the front-to-back, or longitudinal, direction of the vehicle body and the vertical lines 18 and 19 passing through the center of the ground surface at which the front wheels get in touch). It will be seen that the vertical lines 18 and 19 are also perpendicular to the wheel axle lines 10, in accordance with the previously-given definition of the center offset quantity. The zero camber angle of the wheels 6 and 7 is chosen solely to simplify the understanding of the preferred embodiments. In this way, a rotatory moment to compensate (or cancel) the abovementioned inbalanced rotatory moments ($M_R > M_L$) with respect to the above-described left and right king pin axes 8 and 9 is generated to bring such unbalanced state to an equilibrium, thereby preventing the steering wheel from becoming deflected to any one side at the time of the speed acceleration.

The specific construction of compensating the unbalanced rotatory moments between the left and right drive wheels will be explained hereinbelow in reference to FIGS. 3, and 4, and 5 of the accompanying drawing. In these figures of the drawing, the center offset quantity $e_L$ at the left wheel 6 where the drive shaft is longer than that of the right drive shaft is made greater than the center offset quantity $e_R$ at the right wheel 7.

The embodiments shown in FIGS. 3 and 4 applies the suspension device according to the present invention to a MacPherson strut type front wheel suspension device provided with buffer columns 11 and suspension coil springs 12. The columns 11 and ball joints 15 form the king pin axes 8 and 9 for the steering knuckle 13 and the steering knuckles 13' and 13" respectively.

More specifically, the embodiment shown in FIG. 3 is so constructed that the steering knuckle 13' carrying the front wheel 6 at the side of the longer drive shaft is different from the knuckle 13 for the right wheel 7 at the side of the shorter drive shaft. The left knuckle 13' is so constructed that the position of the ball joint portion 15 for the knuckle 13' and the lower arm 14 for the front wheel 6 at the side of the longer drive shaft is shifted to the inside of the vehicle chassis to reduce the angle of inclination of the king pin axis 9 (an inclination which the king pin axis assumes in the left-and-right direction as viewed from the longitudinal (front-to-back) direction of the vehicle body), whereby the center offset quantity $e_L$ is made large.

The embodiment shown in FIG. 4, on the other hand, is so constructed that the steering knuckle 13" carrying the front wheel 6 at the side of the longer drive shaft is different from the knuckle 13 for the right wheel 7 at the side of the shorter drive shaft. The left knuckle 13" is so constructed that the king pin axis 9 at the side of the longer drive shaft is caused to shift parallelly to the inside of the vehicle body, while maintaining the angle of inclination of the king pin axes 8 and 9 of the left and the right wheels 6 and 7 to be identical, thereby augmenting the center offset quantity $e_L$. It is to be noted that the same result can be obtained by shifting the fitting position of the wheel 6 to the outside of the vehicle body without changing the angle of inclination and the position of the king pin axis 9.

The embodiment shown in FIG. 5 is constructed by applying the structure of FIG. 3 (wherein a difference is given in the angles of inclination between the left and the right king pin axes 8 and 9) to a double Wish-bone type front axle suspension device, in which a knuckle 13a for the right wheel 7 and a knuckle 13a' for the left wheel 6 are each supported by an upper arm 16 and a lower arm 17. In the drawing illustration, reference numeral 20 designates an upper ball joint, and 21 designates a lower ball joint. The ball joints 20 and 21 form a king pin axis for the steering knuckles 13a and 13a'.

With both center offset quantities $e_L$ and $e_R$ of the left and the right front wheels and drive force F of the wheels, the rotatory moment relative to the king pin axes 8 and 9 becomes balanced between the left and the right sides as the result of $F \cdot e_L$ becomes equal to $F \cdot e_R$ ($F \cdot e_L = F \cdot e_R$) in view of $e_L$ being normally equal to $e_R$ ($e_L = e_R$), so that the rotatory moment to the steering system is zero.

However, when the center offset quantities $e_R$ and $e_L$ are made in such a relationship that $e_R$ is smaller than $e_L$ ($e_R < e_L$), the rotatory moment to the steering system is in such a relationship that $F \cdot e_R$ is smaller than $F \cdot e_L$ ($F \cdot e_R < F \cdot e_L$), whereby the inbalanced rotatory moments $M_R$ and $M_L$, which are in the relationship of $M_R < M_L$ and which is produced by the difference in the angle of inclination of the left and the right drive shaft, tend to be set off. Accordingly, when the left and the right drive shaft and the king pin axes are so constructed as to satisfying an equation of $M_R + M_L + F \cdot e_R + F \cdot e_L = 0$, the rotatory moment to the king pin axes 8 and 9 can be equalized between the left and the right sides.

Since the present invention is constructed as has been mentioned in the foregoing, the purpose of the invention as set forth in the beginning can be well achieved, and, at the same time, the following advantages can be derived therefrom:

(1) a sufficient road clearance (a height from the ground surface level to the lowest position in the vehicle body) can be taken, even if the diameter of the wheel is small;
(2) the tread can be made small even in the case of installing a power transmission mechanism of a lateral installing and direct connection type; and
(3) a large horse power engine can be safely used even in a vehicle having a difference in the angles of inclination $\theta_L$ and $\theta_R$ in the left and the right drive shafts.

Although the present invention has been described in the foregoing with reference to a few preferred embodiments thereof, it should be noted that these embodiments are merely illustrative and not restrictive, and that any change and modification may be made by those skilled in the art within the spirit and scope of the present invention as recited in the appended claims.

What is claimed is:

1. A suspension device for front wheels in automotive vehicles which comprises in combination: front wheels at both left and right sides of the vehicle body each of said wheels being rotatable about a wheel axle and contacting the ground surface; king pin means for suspension of said front wheels at said both sides of the vehicle body, said king pin means defining a king pin axis at each side of the vehicle body; means for receiving and holding said king pin means; and drive shafts connected at one end thereof to said front wheels and at the other end thereof to an engine output, said drive shafts being different in their shaft length and their angles of inclination, characterized in that a center offset quantity (measured along each said wheel axle between a center line of each said wheel perpendicular to said wheel axle and the king pin axis for each said wheel) is greater at the side of the long drive shaft than at the side of the short drive shaft when the camber of said left and right wheels is the same, said center offset quantities being chosen to compensate unbalanced rotatory moment exerted during vehicle acceleration upon the king pin axis at both left and right sides, said unbalanced rotatory moment being caused by the difference in the angles of inclination of said drive shafts.

2. The suspension device for front wheels in automotive vehicles as set forth in claim 1, wherein the difference in said center offset quantity between said left and right drive shafts is made by causing the inclination of the king pin axis to be smaller at the drive shaft of the long length than at the drive shaft of the short length.

3. The suspension device for front wheels in automotive vehicles as set forth in claim 1, wherein the differences in said center offset quantity between said left and right drive shafts is made by causing a distance from the intersection of the wheel axle and the king pin axis to the fitting surface of the wheel to the wheel axle to be longer at the side of the long drive shaft than at the side of the short drive shaft, the angles of inclination of the king pin axis being the same at both sides.

4. The suspension device for front wheels in automotive vehicles as set forth in claim 1, wherein said suspension device is of MacPherson type.

5. The suspension device for front wheels in automotive vehicles as set forth in claim 1, including a steering knuckle for each said front wheel, said steering knuckle at the side of the long drive shaft being larger in at least one dimension than said knuckle at the side of the short drive shaft.

6. The suspension device for front wheels in automotive vehicles as set forth in claim 1, including a steering knuckle part for each said front wheel, said steering knuckle part having inwardly extending upper and lower portions and a fitting portion for one of said wheels, said king pin axis passing through said inwardly extending portions, the inwardly extending lower portion of said knuckle part including a pivot part defining a lower end of said king pin axis, the distance between said pivot part at the side of the long drive shaft and said fitting for its said wheel being greater than the distance between said pivot part at the side of the short drive shaft and said fitting for its said wheel.

7. The suspension device for front wheels in automotive vehicles as set forth in claim 6, wherein the angle of inclination of the king pin axis is smaller at the side of the long drive shaft than at the side of the short drive shaft.

8. The suspension device for front wheels in automotive vehicles as set forth in claim 6, wherein the distance from the intersection of the wheel axle and the king pin axis to the fitting surface of the wheel to the wheel axis is longer at the side of the long drive than at the side of the short drive shaft, the angle of inclination of the king pin means being the same at both sides.

9. A suspension device for front sheels in automotive vehicles having front wheels, front wheel drive shafts, each having different shaft length and angle of inclination, and king pin means defining king pin axes, in which said king pin axes are fixed with respect to said front wheel drive shafts in such a manner that the following equation is satisfied to compensate unbalanced rotatory moment caused by difference in the angles of inclination of the left and the right front drive shafts: $M_R+M_L+F\cdot e_R+F\cdot e_L=0$ (where: $M_R$ is a rotatory moment exerted upon the king pin axis at the right side; $M_L$ is a rotatory moment exerted upon the king pin axis at the left side; F is a driving force of the front wheels; $e_R$ is a center offset quantity measured along the wheel axle between a center line of the wheel perpendicular to the wheel axle and the king pin axis for said wheel of the right front wheel; and $e_L$ is a center offset quantity measured along the wheel axle between a center line of the wheel perpendicular to the wheel axle and the king pin axis for said wheel of the left front wheel), said center offset quantities $e_R$ and $e_L$ being different when the camber of said left and right wheels is the same, thereby maintaining the balanced state in the rotatory moment in both left and right front wheels.

* * * * *